(12) United States Patent
Jang et al.

(10) Patent No.: US 9,385,547 B2
(45) Date of Patent: Jul. 5, 2016

(54) WIRELESS CHARGING APPARATUS AND ELECTRONIC APPARATUS INCLUDING THE SAME

(71) Applicant: Samsung Electro-Mechanics Co., Ltd., Suwon (KR)

(72) Inventors: Jae Hyuk Jang, Suwon (KR); No Il Park, Suwon (KR); Chang Ryul Jung, Suwon (KR); Hak Kwan Kim, Suwon (KR)

(73) Assignee: SAMSUNG ELECTRO-MECHANICS CO., LTD., Suwon, Gyunggi-Do (KR)

( * ) Notice: Subject to any disclaimer, the term of this patent is extended or adjusted under 35 U.S.C. 154(b) by 499 days.

(21) Appl. No.: 13/761,855

(22) Filed: Feb. 7, 2013

(65) Prior Publication Data

US 2014/0145674 A1 May 29, 2014

(30) Foreign Application Priority Data

Nov. 23, 2012 (KR) ........................ 10-2012-0133606

(51) Int. Cl.
| | |
|---|---|
| *H02J 7/00* | (2006.01) |
| *H01F 38/14* | (2006.01) |
| *H02J 7/02* | (2016.01) |
| *H01F 27/36* | (2006.01) |

(52) U.S. Cl.
CPC .............. *H02J 7/0042* (2013.01); *H01F 27/36* (2013.01); *H01F 38/14* (2013.01); *H02J 7/025* (2013.01)

(58) Field of Classification Search
CPC .................................. H02J 5/005; H02J 7/025

USPC ........................................................ 320/108
See application file for complete search history.

(56) References Cited

U.S. PATENT DOCUMENTS

| | | | |
|---|---|---|---|
| 2008/0164840 | A1 | 7/2008 | Kato et al. |
| 2009/0140691 | A1 | 6/2009 | Jung |
| 2009/0230563 | A1 | 9/2009 | Yamada |
| 2010/0013431 | A1 | 1/2010 | Liu |
| 2010/0046130 | A1* | 2/2010 | Park et al. ........................ 361/56 |
| 2010/0156344 | A1* | 6/2010 | Inoue ...................... H02J 7/025 320/108 |
| 2010/0156750 | A1 | 6/2010 | Ishibashi et al. |
| 2010/0231340 | A1* | 9/2010 | Fiorello et al. .................. 336/92 |

(Continued)

FOREIGN PATENT DOCUMENTS

| | | |
|---|---|---|
| CN | 101304184 | 11/2008 |
| CN | 101447683 A | 6/2009 |

(Continued)

OTHER PUBLICATIONS

Korean Office Action issued Dec. 8, 2014 in corresponding Korean Patent Application No. 10-2014-0151429.

(Continued)

*Primary Examiner* — Suresh Memula
(74) *Attorney, Agent, or Firm* — McDermott Will & Emery LLP

(57) ABSTRACT

There are provided a wireless charging apparatus and an electronic apparatus including the same, and more particularly, a wireless charging apparatus in which a wireless charging coil is integrally formed with a case and an electronic apparatus including the same, the wireless charging apparatus including a case forming an exterior of a product and containing a magnetic powder, and a coil pattern formed on an outer surface of the case.

12 Claims, 3 Drawing Sheets

(56) References Cited

U.S. PATENT DOCUMENTS

| | | | |
|---|---|---|---|
| 2011/0133691 A1 | 6/2011 | Hautanen | |
| 2011/0279002 A1 | 11/2011 | Han et al. | |
| 2012/0235636 A1* | 9/2012 | Partovi | H02J 7/025 320/108 |
| 2012/0274148 A1* | 11/2012 | Sung et al. | 307/104 |
| 2013/0057205 A1* | 3/2013 | Lee | H02J 5/005 320/108 |
| 2014/0084698 A1* | 3/2014 | Asanuma et al. | 307/104 |
| 2014/0176067 A1* | 6/2014 | Suzuki et al. | 320/108 |
| 2014/0266030 A1* | 9/2014 | Park et al. | 320/108 |

FOREIGN PATENT DOCUMENTS

| | | |
|---|---|---|
| CN | 101533815 A | 9/2009 |
| CN | 101630861 | 1/2010 |
| JP | 2008-300411 | 12/2008 |
| JP | 2011-182593 | 9/2011 |
| KR | 10-0611010 | 8/2006 |
| KR | 10-2008-0100336 | 11/2008 |
| KR | 10-1179306 | 9/2012 |
| TW | 200746587 A | 12/2007 |

OTHER PUBLICATIONS

Korean Office Action mailed Jan. 28, 2014 in corresponding Korean Application No. 10-2012-0133606.

Tae-Hwan Noh et al., "Effects of Sheet Thickness on Electromagnetic Wave Absorption Characteristics in FeSiCr/Polymer Composite Sheets", Journal of the Korean Magnetics Society, vol. 20, No. 4, Aug. 31, 2010, pp. 143-148 (English Abstract on p. 148).

Office Action mailed May 28, 2015 in corresponding Chinese Patent Application No. 201310064592.9.

Office Action issued Feb. 16, 2016, in related Chinese Application No. 201310064592.9 (English Translation provided).

\* cited by examiner

WIRELESS CHARGING APPARATUS AND ELECTRONIC APPARATUS INCLUDING THE SAME

CROSS-REFERENCE TO RELATED APPLICATIONS

This application claims the priority of Korean Patent Application No. 10-2012-0133606 filed on Nov. 23, 2012, in the Korean Intellectual Property Office, the disclosure of which is incorporated herein by reference.

BACKGROUND OF THE INVENTION

1. Field of the Invention

The present invention relates to a wireless charging apparatus and an electronic apparatus including the same, and more particularly, to a wireless charging apparatus in which a wireless charging coil is integrally formed with a case and an electronic apparatus including the same.

2. Description of the Related Art

Recently, in order to charge a secondary battery embedded in a portable terminal, or the like, research into a system for transmitting power wirelessly, that is, in a contactless manner, has been conducted.

Generally, a contactless power transmitting apparatus includes a contactless power transmitting apparatus that transmits power and a contactless power receiving apparatus that receives and stores power.

The contactless power transmitting apparatus transmits and receives power using electromagnetic induction and for this purpose, has a coil disposed therein.

The contactless power transmitting apparatus according to the related art is configured so that the coil is wound in parallel with a bottom surface (that is, an external contact surface). Further, the coil is fixed to the bottom surface by an adhesive, an adhesive sheet, or the like.

In case of the related art, as a wire-shaped coil is generally used, the coil is wound in a form in which coils are stacked while overlapping each other when being wound. Therefore, a thickness of the contactless power transmitting apparatus may be increased due to a thickness of a coil, turns of a coil, and the like.

Therefore, a need exists for the development of a wireless charging apparatus having a reduced thickness so as to meet the requirements of a recent tendency for the production of relatively slim devices.

RELATED DOCUMENT (Patent Document 1) Korean Patent Laid-Open Publication No. 2008-0100336

SUMMARY OF THE INVENTION

An aspect of the present invention provides a thin type wireless charging apparatus and an electronic apparatus including the same.

Another aspect of the present invention provides a wireless charging apparatus with a significantly reduced thickness by integrating a wireless charging coil with a case and an electronic apparatus including the same.

Another aspect of the present invention provides a wireless charging apparatus with an increased power transmitting/receiving efficiency by disposing a wireless charging coil outside a case and an electronic apparatus including the same.

According to an aspect of the present invention, there is provided a wireless charging apparatus, including: a case forming an exterior of a product and containing a magnetic powder; and a coil pattern formed on an outer surface of the case.

The coil pattern may be formed on the case by one of a sputtering method, a screen printing method, a metal foil transfer method, and a gravure printing method.

The coil pattern may be formed by filling a pattern-shaped groove formed in the outer surface of the case.

The magnetic powder contained in the case may be a metal magnetic flake or a ferrite powder.

The magnetic powder contained in the case may be a metallic soft magnetic powder having a flake shape.

The magnetic powder contained in the case may include at least one of FeCrSiAl-based corrosion resistant steel, FeSi silicon steel, stainless magnetic steel, FeCuNbSiB nano-crystalline alloy, and FeSiAl-based sendust.

The wireless charging apparatus may further include: a contact pad formed on an inner surface of the case and electrically connected to the coil pattern.

The case may include: a first case formed of a resin material and having a receiving space; and a second case coupled to the first case, including a magnetic powder, and having the coil pattern formed on an outer surface thereof.

The wireless charging apparatus may further include: a magnetic sheet disposed on an inner surface of the case and supplementing magnetism of the case.

The wireless charging apparatus may further include: a metal sheet disposed on an inner surface of the case and shielding electromagnetic waves and leakage flux.

The wireless charging apparatus may further include: an insulating film applied to an outer surface of the coil pattern and formed to have the same color as the case.

The wireless charging apparatus may further include: an insulating protective layer having the same color as the case and attached to the case so as to entirely cover the coil pattern.

According to another aspect of the present invention, there is provided an electronic apparatus, including: the wireless charging apparatus of claim 1; and a battery electrically connected to the coil pattern of the wireless charging apparatus to store voltage induced to the coil pattern.

According to another aspect of the present invention, there is provided an electronic apparatus, including: the wireless charging apparatus of claim 1; and a voltage converting unit supplying power introduced from the outside to the coil pattern of the wireless charging apparatus.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
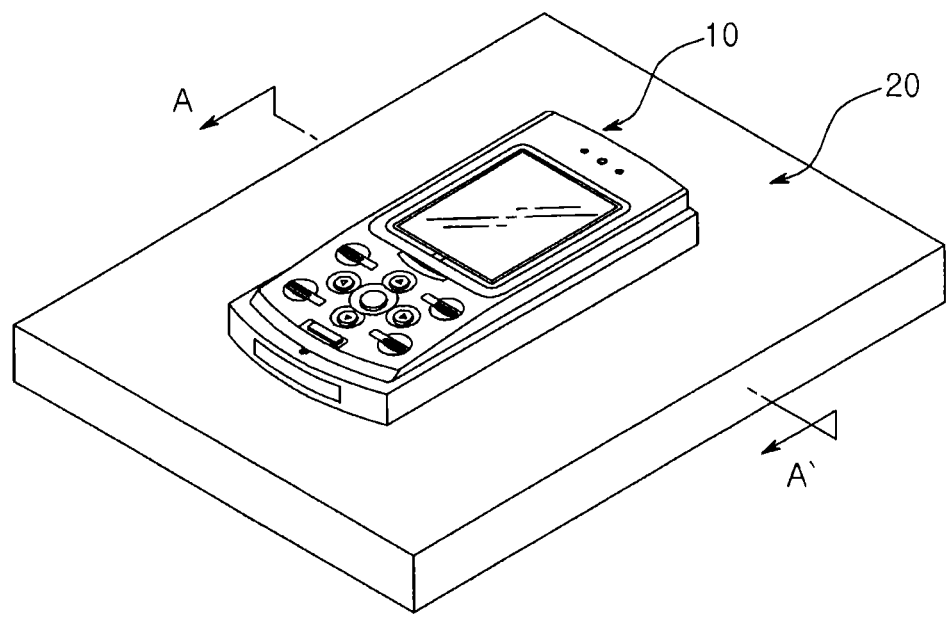
FIG. 1 is a perspective view schematically illustrating electronic apparatuses according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Meanwhile, in describing the embodiment of the present invention, a wireless charging apparatus may be comprehensively referred to as a contactless power transmitting apparatus that transmits power and a contactless power receiving apparatus that receives and stores power.

Figure 2:
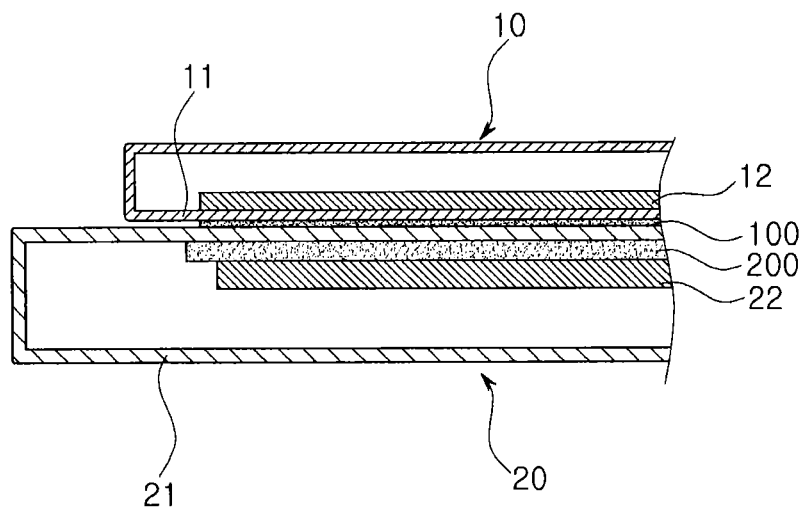
FIG. 2 is a cross-sectional view taken along line A-A' of FIG. 1.

FIG. 1 is a perspective view schematically illustrating electronic apparatuses according to an embodiment of the present invention and FIG. 2 is a cross-sectional view taken along line A-A' of FIG. 1.

Referring to FIGS. 1 and 2, the electronic apparatus according to the embodiment of the present invention may be a portable apparatus 10 or a charging apparatus 20. However, the electronic apparatus may also mean a contactless power receiving apparatus 100 or a contactless power transmitting apparatus 200 that is included in the portable apparatus 10 or the charging apparatus 20.

The portable apparatus 10 may include a battery 12 and the contactless power receiving apparatus 100 that supplies power to the battery 12 for charging the battery 12.

The battery 12 may be a secondary battery capable of being recharged and may be detachable from the portable apparatus 10.

The contactless power receiving apparatus 100 may be directly disposed on an outer surface of a case 11 of the portable apparatus 10 or may be disposed so as to be inserted into the case 11 from the outer surface of the case 11.

Further, the charging apparatus 20 according to the embodiment of the present invention is provided to charge the battery 12 of the portable apparatus 10. To this end, the charging apparatus 20 may include the contactless power transmitting apparatus 200 disposed in a case 21.

The charging apparatus 20 converts household AC power supplied from the outside into DC power and converts the DC power into AC voltage having a specific frequency again, which may in turn be supplied to the contactless power transmitting apparatus 200. To this end, the charging apparatus 20 may include a voltage supply unit 22 that converts household AC power into AC voltage having a specific frequency and supplies the voltage to the contactless power transmitting apparatus 200.

When the AC voltage is applied to a coil (not illustrated) within the contactless power transmitting apparatus 200, a magnetic field around the coil is changed. Therefore, the contactless power receiving apparatus 100 of the electronic apparatus 10 that is disposed adjacently to the contactless power transmitting apparatus 200 is induced with the voltage according to the change in magnetic field, and the battery 12 is charged with the voltage.

Hereinafter, the contactless power receiving apparatus 100 included in the foregoing portable apparatus 10 will be described in more detail.

Figure 3:
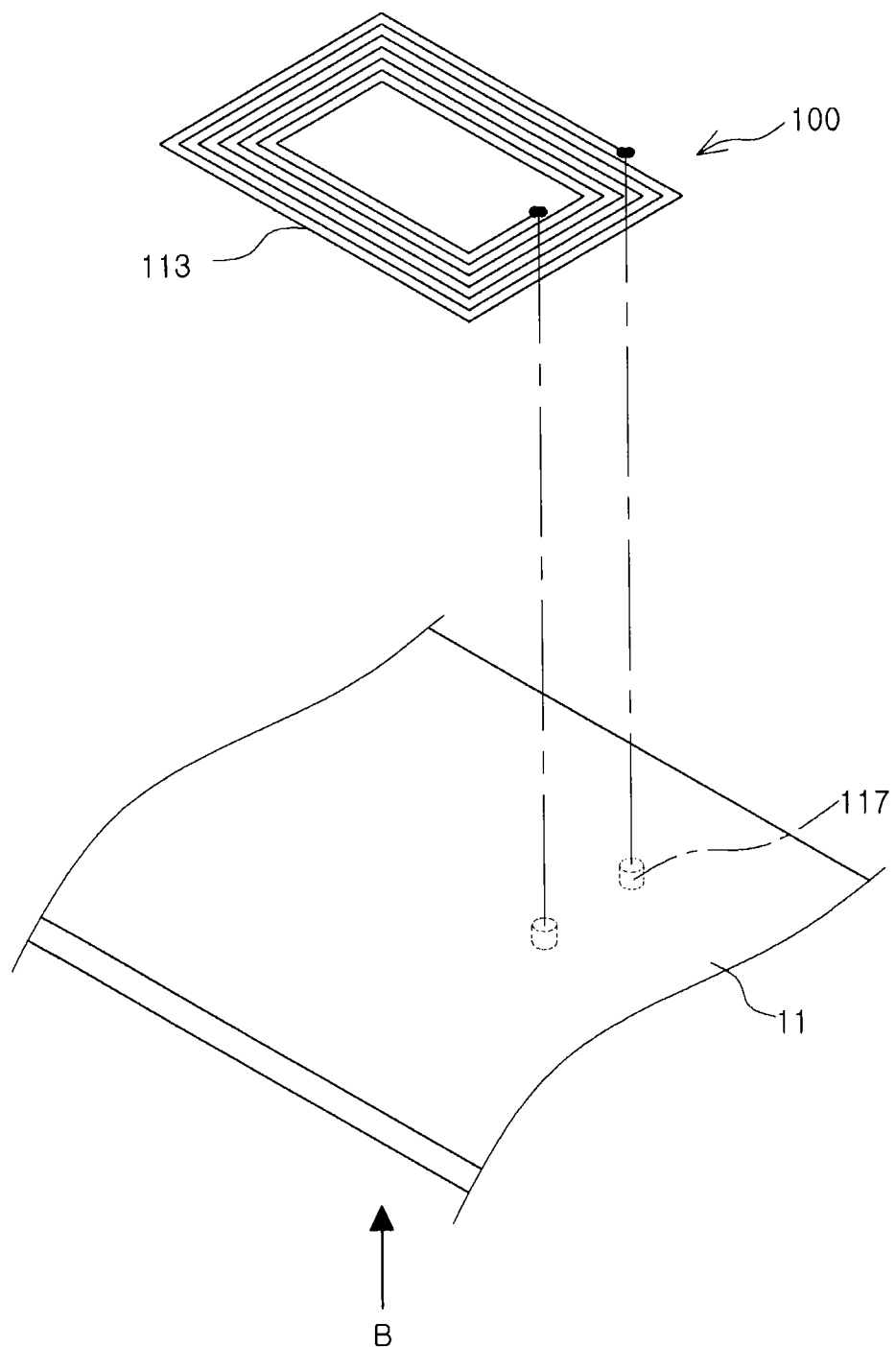
FIG. 3 is an exploded perspective view schematically illustrating a portable apparatus of FIG. 2 according to the embodiment of the present invention.
Figure 4:
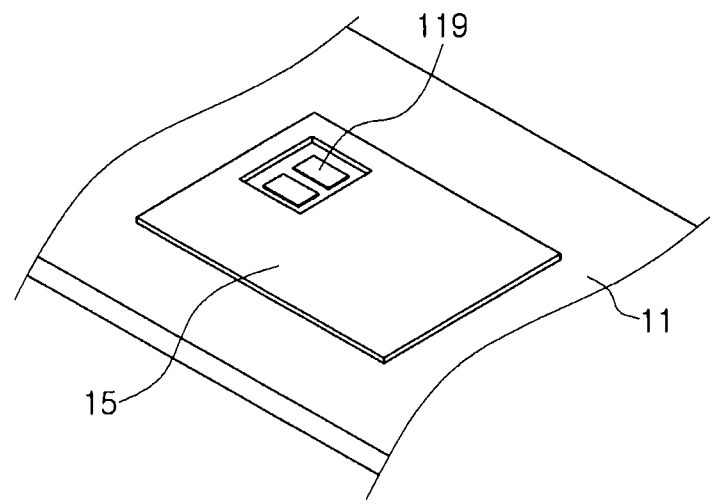
FIG. 4 is a perspective view of FIG. 3 taken in direction B.

FIG. 3 is an exploded perspective view schematically illustrating a portable apparatus of FIG. 2 according to the embodiment of the present invention and FIG. 4 is a perspective view of FIG. 3 taken in direction B.

Referring to FIGS. 3 and 4, the contactless power receiving apparatus 100 is configured to include the case 11 and a coil pattern 113.

The case 11, which has a flat plate shape (or sheet shape), may be a case to enclose the entire portable apparatus 10 and may be a battery cover that is coupled to and separated from the portable apparatus 10 so as to replace the battery of the portable apparatus 10.

At least a part of the case 11 may be formed of a magnetic substance and the outer surface thereof is formed with a coil pattern 113. Therefore, the case 11 according to the embodiment of the present invention may perform an inherent role of the case and a role of effectively forming a magnetic circuit of a magnetic field generated by the coil pattern 113.

For this purpose, the case 11 may be formed of a material that may easily form a magnetic circuit. That is, the case 11 may be formed by mixing a metal magnetic powder, magnetic metal flakes, a ferrite powder, and the like, with a resin material and performing molding thereof.

The case 11 according to the embodiment of the present invention including a magnetic powder may be manufactured by the following manufacturing method.

In the method, a flake processing for a metal powder is first performed using an attrition mill, a planetary mill, or the like. Herein, the attrition mill is an apparatus that forcibly agitates milling balls inserted into a cylindrical container using an impeller, and the metal powder particles are continuously subjected to compression, shear, friction, cold pressure welding, and breaking, according to an impact angle between these balls, and are thus deformed.

In order to manufacture a good flake, the appropriate size of the milling ball, the rotating speed of the impeller, the insertion ratio of a powder sample to a ball, and the like, are important. In the embodiment of the present invention, a diameter of the milling ball was set to be 3 through 30 mm, the rotating speed of the impeller was set to be 50 through 300 rpm, and the insertion ratio of powder sample to ball was set to be 10~50:1.

Meanwhile, in order for a metallic soft magnetic powder to obtain considerable magnetic permeability up to a GHz band, a shape thereof as well as an alloy component determining a saturation magnetization value of a material is important. Therefore, in this step, the powder is machined to be flakes having a large aspect ratio, and thus is subjected to a flaking process in which the powder is thinly prepared to a degree equal to a skin depth.

When the powder has a flake shape, as anisotropic magnetic field is increased due to shape anisotropy, a resonance frequency is higher and an eddy current loss is decreased, such that the high magnetic permeability may exhibit to a higher frequency band.

Herein, the soft magnetic alloy powder may include at least one of FeCrSiAl-based corrosion resistant steel, FeSi silicon steel, stainless magnetic steel, FeCuNbSiB nano-crystalline alloy, and FeSiAl-based sendust that may be fired to have a flake shape while having relatively large saturation magnetization and electrical resistance.

Next, alloy flakes are classified as flakes having a size of several μm through 100 μm by using a sieve shaker, and the like and are mixed with a polymer resin to mold the case 11.

In this case, a mixed amount of the polymer resin may be 3% through 30% with respect to the metal powder.

Herein, as the polymer resin, chlorinated polyethylene (CPE), polypropylene, ethylene propylene rubber (EPDM), natural rubber (NR), nitrile butadiene rubber (NBR), polyvinyl chloride (PVC), polyimide-based and polyester-based resin, and the like may be used, and a mixture of an ABS resin with PC, a thermosetting resin such as PVC, and the like, may be used.

Meanwhile, the case 11 according to the embodiment of the present invention is not limited to the foregoing configuration and may be manufactured by various methods, such as a method of applying a ferrite powder, a magnetic solution, and the like, to the outer surface of the case 11 and then disposing the coil pattern 113, and the like, therein, if necessary.

Further, a sheet 15 may be further added to an inner surface of the case 11, if necessary. Herein, the sheet 15 may be a metal sheet for shielding electromagnetic waves or leakage flux. In this case, the metal sheet may be formed of aluminum, and the like, but the embodiment of the present invention is not limited thereto.

Further, the sheet 15 is a magnetic substance and may be a magnetic sheet for supplementing a function of the case 11.

The sheet 15 may be formed in an adhesive sheet form or an adhesive tape form and may be formed by applying an adhesive or a resin having adhesion on the surface of the case 11. In this case, the adhesive or the resin may contain a metal powder or a ferrite powder.

Meanwhile, the sheet 15 according to the embodiment of the present invention is a component provided so as to supplement a magnetic function of the case and may be omitted, if necessary.

As such, when the case 11 is formed of a magnetic substance, the thickness of the case 11 may correspond to a thickness of a magnetic substance, such that the magnetic substance may be formed thickly.

Generally, in the wireless charging apparatus, when the magnetic sheet or the magnetic layer is formed thickly, the wireless charging efficiency is increased. Therefore, in the case of the wireless charging apparatus 100 according to the embodiment of the present invention, the entire thickness can be decreased and the wireless charging efficiency can be increased.

The coil pattern 113 is formed on the outer surface of the case 11 in a pattern form.

The coil pattern 113 according to the embodiment of the present invention is manufactured separately from the case 11 and thus is attached to or detached from the case 11 and is integrally manufactured with the case 11 as the pattern is directly formed on the case 11.

As the method of forming the coil pattern 113 in the case 11, a sputtering process, a screen printing process, a metal foil transfer process, a gravure printing process, and the like, may be used, but the embodiment of the present invention is not limited thereto.

Herein, in case of using the method such as the screen printing, and the like, the coil pattern 113 may be formed by first forming a groove having the coil pattern 113 shape on the outer surface of the case 11, filling the groove with a conductive paste, and the like, and curing the conductive paste. Therefore, in this case, the coil pattern 113 may have a form in which the coil pattern 113 is filled in the groove formed in the case 11.

Meanwhile, in the drawings, the case in which the coil pattern 113 generally has a square spiral shape is illustrated byway of example, but the embodiment of the present invention is not limited thereto. Therefore, the coil pattern 113 may have various shapes, such as a circular or polygonal spiral shape.

Further, the outer surface of the coil pattern 113 may be provided with an insulating film (not illustrated) having the same color as the case 11 so as to protect the coil pattern 113. In this case, the coil pattern 113 may be shown to have the same color as the case 11 to considerably reduce the awareness of difference between the coil pattern 113 and the case 11.

In addition, the outside of the coil pattern 113 may be provided with an insulating protective layer (for example, a resin insulating layer (not illustrated)) that is attached to the case 11 so as to cover the entire coil pattern 113, thereby protecting the coil pattern 113 from the outside, if necessary. Even in this case, the insulating protective layer may have the same color as the case 11. However, the embodiment of the present invention is not limited thereto.

The coil pattern 113 may be electrically connected to a contact pad 119.

The contact pad 119 is disposed on the inner surface of the case 11 so as to electrically connect the coil pattern 113 with the battery 12. The contact pad 119 is electrically connected to both ends of the coil pattern 113, respectively. To this end, at least two contact pads 119 may be provided and the case 11 may be provided with a via 117 so as to connect the coil pattern with 113 the contact pad 119.

The contact pad 119 may be formed in a pad form and may be formed in a pin form having elasticity, if necessary.

Further, although not illustrated, the contactless power receiving apparatus 100 according to the embodiment of the present invention may further include a connection member (not illustrated) for electrically connecting the contact pad 119 with the battery (12 of FIG. 2) so as to supply power generated from the coil pattern 113 to the battery 12.

As the connection member, a conductive wire may be used and a thin film circuit board (for example, a flexible board) having a wiring pattern formed therein may be also used.

As set forth above, the wireless charging apparatus according to the embodiment of the present invention does not use the wire-shaped coil but uses the coil pattern directly disposed on the case, thereby making the thickness of the wireless charging apparatus or the electronic apparatus including the same thin.

Further, the wireless charging apparatus according to the embodiment of the present invention does not separately include the magnetic sheet as in the related art, but the case serves as the magnetic sheet. Therefore, the thickness can be reduced to an amount equal to thicknesses of the magnetic sheet of the related art and the adhesive sheet for bonding the magnetic sheet and thus, the manufacturing costs can be reduced.

In addition, according to the embodiment of the present invention, in the wireless charging apparatus, the case is formed of the magnetic substance, thereby allowing the thickness of the magnetic substance to increase. Therefore, the wireless charging efficiency can be increased.

As described above, the wireless charging apparatus and the electronic apparatus including the same are not limited to the foregoing embodiments and can be variously modified by those skilled in the art within the technical spirit of the present invention.

Figure 5:
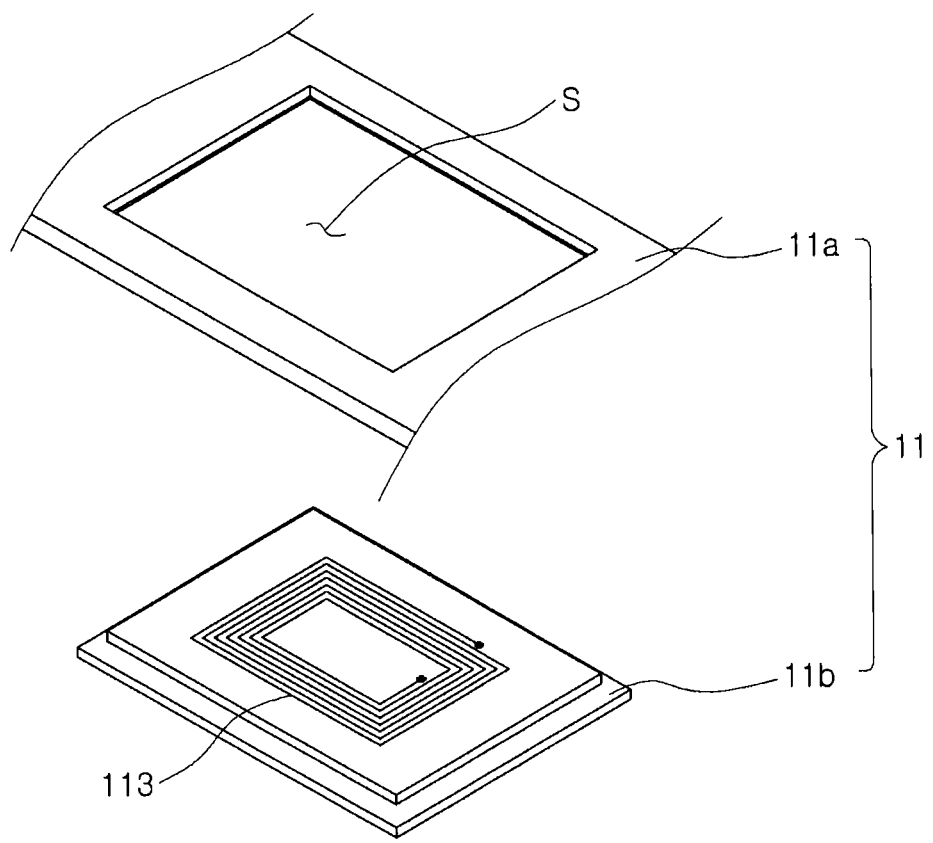
FIG. 5 is an exploded perspective view schematically illustrating a portable apparatus according to another embodiment of the present invention.

FIG. 5 is an exploded perspective view schematically illustrating a portable apparatus according to another embodiment of the present invention.

The portable apparatus according to the embodiment of the present invention is configured similar to that of the foregoing embodiment and has a difference only in the structure of the case and the wireless charging apparatus. Therefore, the detailed description of the same configuration as the foregoing embodiment is omitted and only the configuration having a difference therebetween will be described in detail.

Referring to FIG. 5, in the electronic apparatus according to the embodiment of the present invention, the case 11 may include a first case 11a a second case 11b.

The first case 11a is a general case and may be a case formed of a resin material according to the related art.

The first case 11a has a receiving region S coupled to the second case 11b. Herein, the receiving region S may be formed to have a through hole shape.

The second case 11b us coupled to the receiving region S of the first case 11a. Therefore, a single case 11 is completed by coupling the second case 11b to the first case 11a.

The second case 11b may be formed of a material having a magnetic powder mixed therein according to the foregoing embodiment. Further, the outer surface of the second case 11b may be provided with the coil pattern 113.

That is, in the portable apparatus according to the embodiment of the present invention, the entire case is not formed of the material having the magnetic powder mixed therein, and only the portion of the case 11 in which the coil pattern 113 is formed is formed of the material having the magnetic powder mixed therein.

Therefore, the amount of magnetic powder disposed in the unnecessary part may be considerably reduced, such that the manufacturing cost may be reduced.

The first case 11a and the second case 11b may be integrally coupled by an adhesive member (not illustrated), and the like. However, the embodiments of the present invention are not limited thereto. For example, various methods, such as a method of coupling the second case 11b to the first case 11a by a sliding coupling method, an inserting method, and the like, a method of integrally forming the second case 11b and the first case 11a at the time of manufacturing the first case 11a by first manufacturing the second case 11b and then disposing the second case 11b in a mold, and the like, may be used.

Meanwhile, the present invention describe, by way of example, the case in which the foregoing embodiments are applied to the contactless power receiving apparatus of the portable apparatus in the wireless charging apparatus, but the foregoing embodiments may be applied to the contactless power transmitting apparatus of the charging apparatus, and therefore can be variously applied, if necessary.

Further, the present invention describes, by way of example, in which the foregoing embodiments are applied to the wireless charging apparatus, but is not limited thereto and may also be applied to electronic apparatus including a coil and a case without the charging apparatus.

As set forth above, the wireless charging apparatus according to the embodiment of the present invention does not use the wire-shaped coil but uses the coil pattern directly disposed on the case, thereby allowing a reduction in the thickness of the wireless charging apparatus or the electronic apparatus including the same.

Further, the wireless charging apparatus according to the embodiment of the present invention does not separately include the magnetic sheet as in the related art, but the case serves as the magnetic sheet. Therefore, the thickness thereof can be reduced in an amount equal to thicknesses of the magnetic sheet of the related art and the adhesive sheet for bonding the magnetic sheet and the manufacturing costs can be reduced by the same amount.

In addition, according to the embodiment of the present invention, in the wireless charging apparatus, the case is formed of the magnetic substance, thereby allowing the thickness of the magnetic substance to increase. Therefore, the wireless charging efficiency can be increased.

While the present invention has been shown and described in connection with the embodiments, it will be apparent to those skilled in the art that modifications and variations can be made without departing from the spirit and scope of the invention as defined by the appended claims.

What is claimed is:

1. A wireless charging apparatus, comprising:
   a case forming an exterior of a product, containing a magnetic powder and providing a magnetic circuit of a magnetic field;
   a coil pattern formed on an outer surface of the case, in which a voltage is induced according to a change in the magnetic field generated by a contactless power transmitting apparatus;
   a contact pad disposed on an inner surface of the case and electrically connected to the coil pattern; and
   a via penetrating through the case and connecting the coil pattern and the contact pad to each other.

2. The wireless charging apparatus of claim 1, wherein the coil pattern is formed on the case by one of a sputtering method, a screen printing method, a metal foil transfer method, and a gravure printing method.

3. The wireless charging apparatus of claim 1, wherein the coil pattern is formed by filling a pattern-shaped groove formed in the outer surface of the case.

4. The wireless charging apparatus of claim 1, wherein the magnetic powder contained in the case is a metal magnetic flake or a ferrite powder.

5. The wireless charging apparatus of claim 1, wherein the magnetic powder contained in the case is a metallic soft magnetic powder having a flake shape.

6. The wireless charging apparatus of claim 1, wherein the magnetic powder contained in the case includes at least one of FeCrSiAl-based corrosion resistant steel, FeSi silicon steel, stainless magnetic steel, FeCuNbSiB nano-crystalline alloy, and FeSiAl-based sendust.

7. The wireless charging apparatus of claim 1, wherein the case includes:
   a first case formed of a resin material and having a receiving space; and
   a second case coupled to the first case, including a magnetic powder, and having the coil pattern formed on an outer surface thereof.

8. The wireless charging apparatus of claim 1, further comprising a magnetic sheet disposed on an inner surface of the case and supplementing magnetism of the case.

9. The wireless charging apparatus of claim 1, further comprising a metal sheet disposed on an inner surface of the case and shielding electromagnetic waves and leakage flux.

10. The wireless charging apparatus of claim 1, further comprising an insulating film applied to an outer surface of the coil pattern and formed to have the same color as the case.

11. The wireless charging apparatus of claim 1, further comprising an insulating protective layer having the same color as the case and attached to the case so as to entirely cover the coil pattern.

12. An electronic apparatus, comprising:
    a wireless charging apparatus including a case forming an exterior of a product, containing a magnetic powder and providing a magnetic circuit forming a magnetic field; a coil pattern formed on an outer surface of the case, in which a voltage is induced according to a change in the magnetic field generated by a contactless power transmitting apparatus; a contact pad disposed on an inner surface of the case and electrically connected to the coil pattern; and a via penetrating through the case and connecting the coil pattern and the contact pad to each other; and a battery electrically connected to the coil pattern of the wireless charging apparatus to store the voltage induced to the coil pattern.

* * * * *